Jan. 11, 1938. W. F. HUNKELER 2,105,420
LENS MOUNTING
Filed Dec. 31, 1936
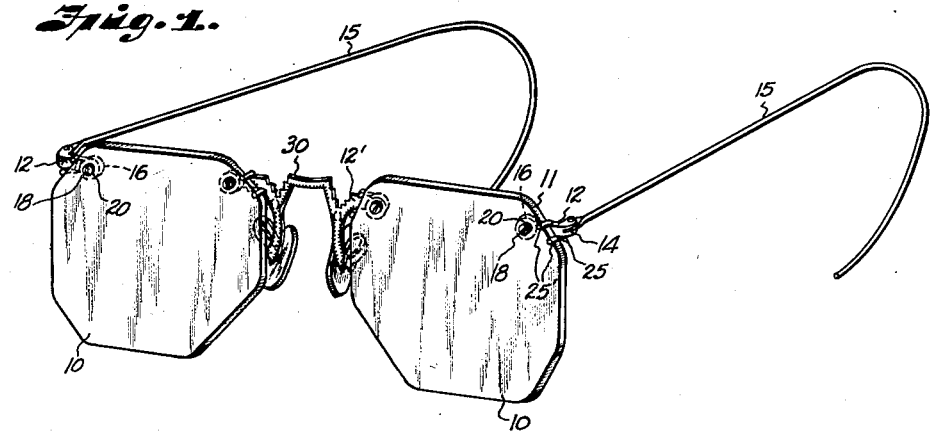
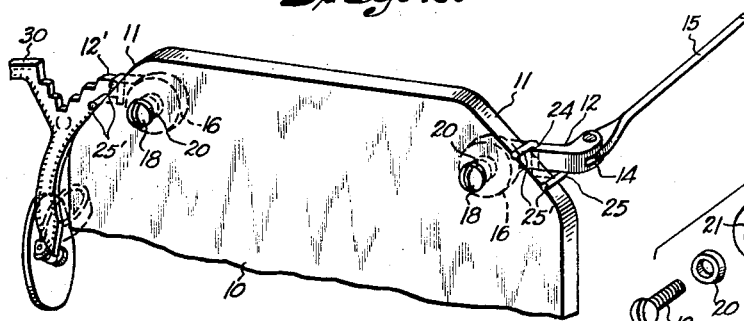
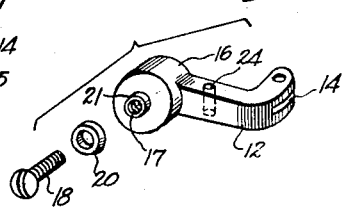
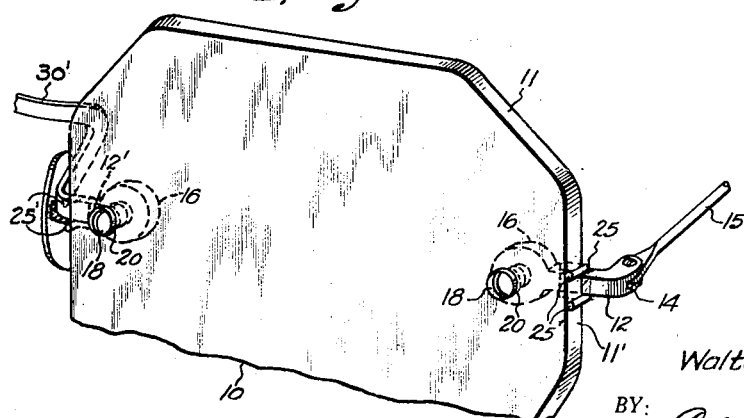
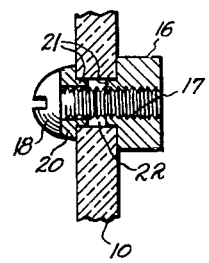
INVENTOR:
Walter F. Hunkeler,
BY: Chas W Gerard
ATTORNEY.

Patented Jan. 11, 1938

2,105,420

UNITED STATES PATENT OFFICE 2,105,420

LENS MOUNTING

Walter F. Hunkeler, Kansas City, Mo.

Application December 31, 1936, Serial No. 118,533

4 Claims. (Cl. 88—47)

The present invention relates to improvements in mountings for the lenses of eye glasses, with particular reference to mountings for lenses of the rimless type.

The special object of the invention is to provide a lens mounting which will obviate the necessity of angular mountings such as are ordinarily required for lenses of the so called full-view type in order to accommodate the angular relation between the lenses and the nose piece or bridge and the frames or temple elements.

For this purpose I provide a mounting in combination with an element for engagement with the lens margin which comprises an intermediate portion carried by the mounting and terminal portions and projecting in position for engagement with the edge of the lens at points spaced apart sufficiently for properly bracing the mounting so that the latter is securely held in the required relation to the lens.

The invention provides the improved relationship as regards both the nose bridge and the outer temple elements and their connections with the lens.

It is also sought to provide a construction which will effect the improved results and also accomplish the desired purpose in a more simple and efficient manner and with a minimum of expense, so that important economies are made possible with regard to those parts of eye glasses affected by the invention.

With the foregoing general objects in view, as well as minor objects hereinafter referred to, the invention will now be described with reference to the accompanying drawing illustrating one of the preferred methods of practicing the invention and embodying the proposed improvements, after which those features and combinations deemed to be novel will be particularly set forth and claimed.

In the drawing—

Figure 1 is a perspective view illustrating a pair of eye glasses provided with lens mountings constructed in accordance with the present invention;

Figure 2 is a similar view, on an enlarged scale, illustrating a portion of one of the lenses, with the improved mountings applied thereto;

Figure 3 is a similar view, but illustrating the improved mountings attached to the lens in a different relation;

Figure 4 is a perspective view illustrating certain elements of the mounting in separated relation; and Figure 5 is an enlarged sectional detail, showing a portion of the lens and the screw-attached portions of the mounting device.

In the fitting of eye glasses, one matter which requires special attention is the type of connection made between the lenses and the mountings for the nose piece and temples to provide the style of mounting desired by the customer. As modes change, in the shapes of lenses as well as of mountings, some adjustment or accommodation is ordinarily required to provide the proper connections between lenses and mountings in order that the lenses will be set and maintained at the right angle when in use. As the styles in lenses change, with different forms of contour, such as angular edges, or the mountings are attached thereto in varied relations, as in the case of the full-view type where the mountings and particularly the temples are attached to the upper corners of the lenses, an accommodation must be made for the particular angle at which the mountings must be attached to the lens, which is ordinarily taken care of by so constructing or forming the mountings that the strap elements which embrace the edge of the lens will be presented at the proper angle thereto for that purpose. Such special construction, or bending or distorting the mounting for accomplishing the desired purpose, is objectionable for various reasons, since it is more expensive to provide the special form of which several varieties may be required, and to bend a mounting or its strap portion may result in some damage to it, and an operation of this sort on the usual strap type of mounting is not always apt to be sufficiently accurate.

It is therefore an important object of the invention to devise a mounting structure in which a very simple provision is made for accomplishing the necessary functions of the strap elements, and which will be of such a character as to enable it to be adapted to the uses and adjustment or accommodations required by the special forms or types of lenses above referred to.

Referring now to the drawing in detail, and more particularly to Figures 1, 2, 4 and 5, the lens and mounting structures shown are of the full-view design, employing lenses 10 to the upper angular edges 11 of which the mountings are attached. For the end pieces, each of the mountings comprises a bar or arm portion 12 which is forked as at 14 for the corresponding frame or temple 15, while the inner or lens-engaging end of said arm portion is enlarged to form a head portion 16, which may be of any desired design, such as the cylindrical form shown, and provided with a threaded bore 17 for an attaching and clamping screw 18. The head of the screw 18 engages a suitable washer 20, which washer as well as the mouth of the bore 17 are formed with nipple projections 21 for fitting the openings 22 in the margin of the lens 10, as the parts are assembled on the opposite spaces thereof, as clearly illustrated in Figure 4,—thus securely anchoring the parts in the relation shown.

Intermediate its ends the bar or arm 12 is provided with an opening 24 for the mountings of the intermediate portion of the lens edge-engaging element 25 which is constructed of suitable material for the purpose, such as wire material having relatively stiff properties and still of a moderately resilient character. The end portions of this element 25 are bent so as to bring their terminals 25' at right angles to the lens and into retaining engagement with the adjacent edge 11 as represented in Figure 2. When thus assembled, the terminals 25' firmly embrace the edge 11 and at points spaced sufficiently far apart to hold the lens and mounting securely against any relative turning or twisting movement, as required by conditions of actual use.

At the inner end of the lens, the nose piece or bridge member 30 may be of any desired design with the exception that each of its lens-attaching portions is constructed to provide an arm or bar 12' for accommodating a lens edge-engaging element 25 for retaining engagement with the adjacent edge 11, as well as the other structural elements including the clamping screw 18 and washer element 20, as in the case of the end mounting structure already described.

In Figure 3, I illustrate a lens and the adaptability of the device for attachment in proper relation to the vertical side edges 11' of the lens 10 at either the end piece or nose bridge, for which purpose it is evident that the terminals 25' of the element 25 need only be bent to bring them into the required engagement at spaced points along said straight edges, as shown.

It will therefore be apparent that a practical and efficient mounting structure has been devised for carrying out all the desired objects of the invention, and that the mounting is adapted not only for meeting ordinary lens mounting requirements (as illustrated in Figure 3), but is also readily conformable for the purpose of fulfilling all the requirements which can possibly be met with in so-called angular mounting arrangements, as exemplified in Figures 1 and 2. The construction is extremely simple, requiring a minimum number of parts; and the opening 24 for the lens edge-engaging element 25 is conveniently made at right angles through the arm 12, since with the intermediate portion of said element mounted in the opening its projecting terminal portions may thereupon be readily bent in any required manner for bringing the terminals into proper lens-engaging position. The improved construction also has the advantage of being of an inconspicuous character, being practically unnoticeable and therefore detracting in no way from the appearance of the glasses. Moreover, as it has been stated that the lens-engaging element 25 is preferably of a slightly resilient character, this is in the interests of safety as regards the lens engaging and holding function,—being such as to incur little likelihood of any injury to the edges of the lenses.

While I have illustrated and described what I now regard as the preferred mode of practicing the invention, and a practical embodiment of the proposed improvements, I desire to be understood as expressly reserving the right to make whatever changes or modifications may fairly fall within the scope of the appended claims.

What I claim, and desire to secure by Letters Patent, is:

1. A lens mounting comprising an arm, a lens edge-engaging element carried by said arm outside the plane of the lens and having terminal portions extending transversely across the edge of the lens at opposite sides of said arm, and means for securing said arm to the lens independently of said edge-engaging element.

2. A lens mounting comprising an arm, a lens edge-engaging element of pliant material having its intermediate portion mounted on said arm outside the plane of the lens and its terminal portions extending transversely across the edge of the lens at opposite sides of said arm, and means for securing said arm to the lens independently of said edge-engaging element.

3. A lens mounting comprising an arm, a lens edge-engaging element of stiff wire-like material having its intermediate portion threaded through said arm outside the plane of the lens and fixedly mounted in said arm, the projecting terminal portions of said element being pliant and extending transversely across the edge of the lens at opposite sides of said arm, and means for securing said arm to the lens independently of said edge-engaging element.

4. A lens mounting comprising an arm provided with a transverse opening therethrough outside the plane of the lens, a lens edge-engaging element of pliant and slightly resilient material threaded through said opening and fixedly mounted in said arm, said edge-engaging element having terminal portions extending transversely across the edge of the lens at opposite sides of said arm, and means for securing said arm to the lens independently of said edge-engaging element.

WALTER F. HUNKELER.